US005239472A

United States Patent [19]

Long et al.

[11] Patent Number: 5,239,472

[45] Date of Patent: Aug. 24, 1993

[54] SYSTEM FOR ENERGY CONSERVATION ON RAIL VEHICLES

[75] Inventors: Andrew M. Long, South Perth; Ian P. Milroy, Gawler East; Basil R. Benjamin, South Australia; Guiseppe A. Gelonese, South Australia; Peter J. Pudney, South Australia, all of Australia

[73] Assignee: Techsearch Incorporated, South Australia, Australia

[21] Appl. No.: 499,320

[22] PCT Filed: Sep. 28, 1989

[86] PCT No.: PCT/AU89/00421

§ 371 Date: May 25, 1990

§ 102(e) Date: May 25, 1990

[87] PCT Pub. No.: WO90/03622

PCT Pub. Date: Apr. 5, 1990

[30] Foreign Application Priority Data

Sep. 28, 1988 [AU] Australia ............................ PJ 0654

[51] Int. Cl.[5] ............................................ G06F 15/50

[52] U.S. Cl. ............................ 364/426.05; 246/182 R

[58] Field of Search ........... 364/443, 436, 444, 426.04, 364/426.05, 446; 246/182 R, 182 B; 340/994; 180/170, 179

[56] References Cited

U.S. PATENT DOCUMENTS

| | | | |
|---|---|---|---|
| 4,179,739 | 12/1979 | Virnot | 364/436 |
| 4,181,943 | 1/1980 | Mercer, Sr. et al. | 364/436 |
| 4,217,643 | 8/1980 | Anderson et al. | 364/426.05 |
| 4,566,067 | 1/1986 | Sahasrabudhe et al. | 364/436 |
| 4,617,627 | 10/1986 | Yasunobu et al. | 364/426.05 |

FOREIGN PATENT DOCUMENTS

| | | |
|---|---|---|
| 0007881 | 2/1980 | European Pat. Off. . |
| 0043665 | 1/1982 | European Pat. Off. . |
| 971766 | 10/1965 | United Kingdom . |
| 2154524 | 10/1985 | United Kingdom . |

*Primary Examiner*—Gary Chin

*Attorney, Agent, or Firm*—Webb, Burden, Ziesenheim & Webb

[57] ABSTRACT

A method and means is provided whereby a vehicle travelling between two fixed points may be controlled either automatically or by prompting a driver to accelerate, coast and brake when required to meet a predetermined time of arrival at the finish point such that any period of coasting is maximized. Use of this method maximizes fuel efficient usage by the vehicle. The progress of the vehicle is monitored and will translate into a velocity/distance curve. The time to COAST and BRAKE is determined from knowing and approximating the vehicle's coasting and braking characteristics along the route path ahead and in conjunction with the real time velocity/distance curve provides intersection points. Those points represent COAST and BRAKE times and means to indicate the action of COAST and BRAKE are then actuated.

17 Claims, 3 Drawing Sheets

SYSTEM FOR ENERGY CONSERVATION ON RAIL VEHICLES

This invention relates to a method and means for controlling a vehicle which maximises the period of coasting of a vehicle travelling between two points when required to meet a predetermined time of arrival at the finish point.

PRIOR ART

In urban mass transit systems, automatic operation of individual trains and other passenger and freight transport means has been used for a number of years, and most new proposals for systems in large cities provide for such automation. However all systems (as far as is known to the applicant) which in particular run the trains under automatic control do so in accordance with predetermined velocity-distance or velocity-time profiles. With manually driven trains the extent to which any type of energy efficient tactics are employed by drivers is usually not the primary aim of the automatic system. However, it is a desirable object that vehicles travelling between any two points be capable of maximising the efficiency of their travel.

OBJECT OF THE INVENTION

It is an object of this invention to provide a means and method whereby there is provided a means to control a vehicle in an energy efficient manner while still conforming to the required schedule of travel between two points.

EMBODIMENTS

In one embodiment of the invention the means comprises an advisory panel which presents advice to a driver so as to maximise a period of coasting which can occur prior to braking towards a station stop or speed restriction, the advisory panel being fed with information derived from rotation of train wheels, and stored data relating to the train's schedule and running characteristics, calculated in a computer or microprocessor and fed to read-out means on said panel so as to signal correct fuel efficient tactics. It is also possible for the signals provided by the invention to be used to directly control any vehicle operating under similar time constraints.

In another embodiment the invention relates to a method, the method consisting of the receipt of pulses responsive to distance travelled by the train wheels, storing data on the train's schedule and running characteristics in a computer or microprocessor, upgrading the data during the traverse of the train between two adjacent stations, calculating the correct times for commencing and terminating coasting periods from the current speed of the train due to the remaining distance and the time to the next station, together with stored data, and thereby signalling the train driver at the times that the coasting phase should be commenced and terminated, in order to arrive at the next scheduled point on time but with reduced energy consumption.

An embodiment of the invention is described in more detail hereunder with reference to, and is detailed in the accompanying figures.

Figure 1A:
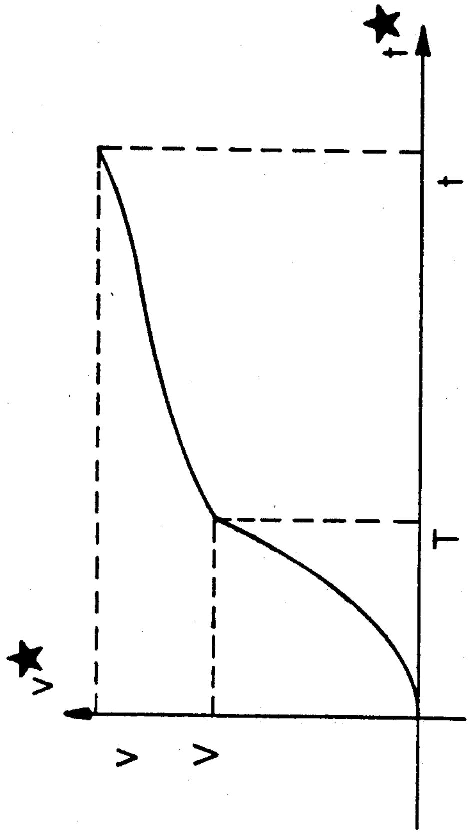
FIG. 1A shows a pictorial representation of the acceleration of the vehicle.

This embodiment is specifically directed to diesel powered trains which are identified as "STA Class 2000", and in most instances utilizes existing timetables, however, in certain instances existing timetables prepared for passenger information require some minor modification which involve increasing the accuracy of arrival and departure to second accuracy instead of minute accuracy.

Practical tests have confirmed estimated fuel savings in the range of 8–14% by use of this invention.

The system software was developed so that the required data for train performance could be gathered in real time. In this embodiment the equipment "learns" the required train performance over a series of five commissioning runs, and updates its knowledge thereafter, so that variations of train performance on each station-to-station section are automatically accounted for.

During the simulation phase of the development, a study was made of the factors relating to operation of a train, which influence fuel consumption. It was established that, for trains operating on relatively level track, the mechanical energy required to be delivered at the rail interface can be substantially reduced by use of appropriate driving tactics. The energy saving available depends on the available "slack" in the timetable; for example, if a train's performance is such that the next station cannot be reached on schedule by "flat out" driving, then there is no scope for energy saving. Most operating timetables do, however, provide about 4% slack to allow for recovery from disturbances to running. This translates to about 12% potential energy saving from use of optimal driving tactics.

For the benefits of the invention to be fully realised, it is desirable that diesel engines should be tuned so that they are at peak efficiency while running at maximum available power. The same principles apply to other types of trains, whether AC electric, DC electric, or diesel electric trains. It should be noted that when accelerating away from the station, drivers should use maximum available power until they reach the indicated running speed, or until a coast decision is indicated. The only two driving sequences that should be applied for a train to be on-time are:

(a) ACCELERATE, SPEEDHOLD, COAST, BRAKE or (b) ACCELERATE, COAST, BRAKE

When a train is late the COAST phase is automatically shortened or deleted by this invention. If early, the COAST phase is extended.

CALCULATION OF "TIME TO BRAKE" AND "TIME TO COAST"

If the progress of the train is plotted on a velocity-distance graph, with velocity and distance being measured with sufficient frequency and accuracy, the BRAKE decision should be made when the train's trajectory from this plane encounters a switching curve. This curve is parabolic in form as shown in FIG. 1, and is given by $$v^2=2B(x_T-x)$$

where $x_T$ = target distance (m)

x = position (m)

B = mean deceleration during braking (m/sec$^2$)

The BRAKE decision algorithm automatically provides this advice to the driver two seconds before action is required, and sounds a warning buzzer. In practice the BRAKE decision is therefore mainly influenced by the speed and position of the train, at the time when it has to be made.

CALCULATION OF "TIME TO COAST" AND "TIME TO BRAKE"

Figure 1:
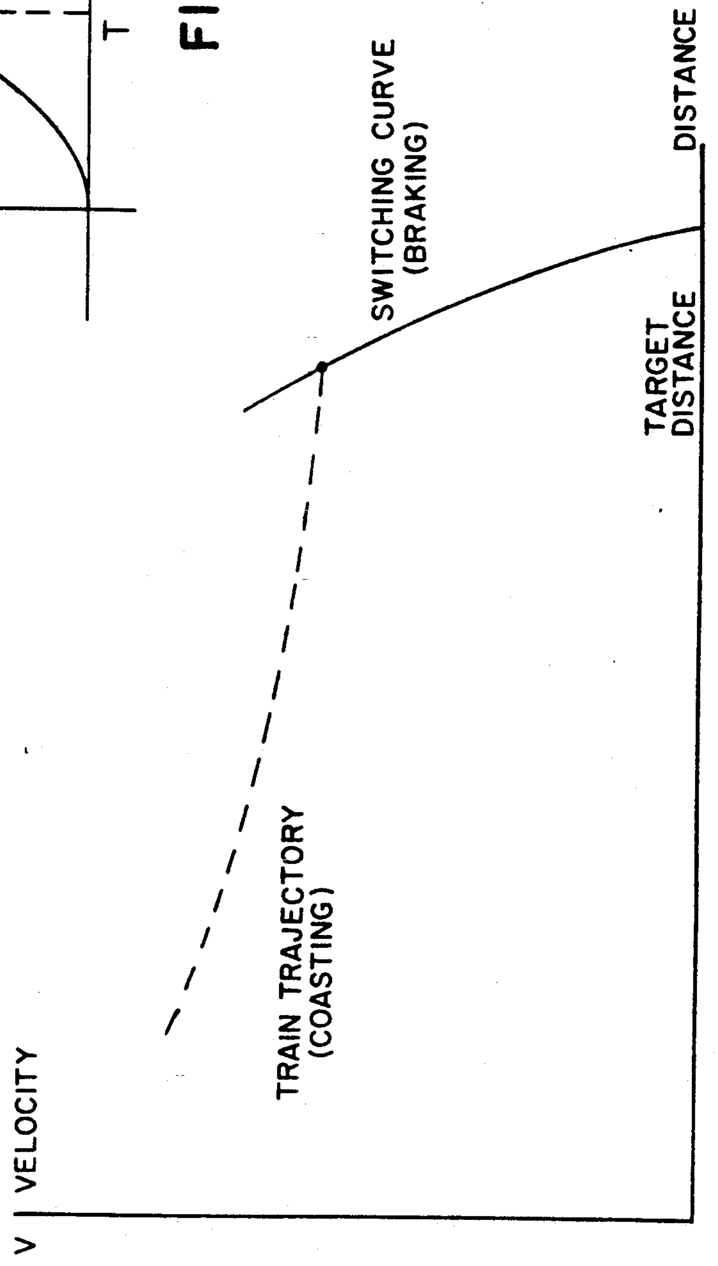
FIG. 1 shows a pictorial representation of the speed of the vehicle during coasting and then braking.

Referring to FIG. 1A the diagram represents the change of speed of the train during coasting and then braking. If X is the distance travelled during braking then $$X = \int_0^{T_v^*} dt^* \quad (1)$$

and if x is the distance that can be travelled in time t from speed v then $$x - X = \int_T^{t_v^*} dt^* \quad (2)$$

$$x = \int_0^{T_v^*} dt^* + \int_T^{t_v^*} dt^*. \quad (3)$$

In the special case of constant deceleration during both braking and coasting $$\text{so } \frac{dv^*}{dt^*} = A \text{ for } 0 < A^* < T \text{ and}$$

$$\frac{dv^*}{dt^*} = a \text{ for } T < t^* < t \text{ then}$$

$$V = AT \text{ and} \quad (4)$$

$$v - V = a(t - T) \text{ so} \quad (5)$$

$$T = \frac{v - at}{A - a} \text{ also} \quad (6)$$

(1) becomes $X = \frac{1}{2}AT^2 = \frac{1}{2}VT = V^2/2A$ (7)

(2) becomes $x - X = \frac{1}{2}(v + V)(t - T)$ so (8)

(3) becomes $x = \frac{1}{2}\{VT + (v + V)(t - T)\}$ so (9)

(6) gives $T$ ("time to brake") then (4) gives $V$ (speed at braking) and (9) gives $x$ (distance attainable)

all in terms of $v$, $t$, $a$, $A$.

$$\text{(9) then becomes } x = \frac{1}{2}\left\{ vt - \frac{(v - At)(v - at)}{A - a} \right\} \quad (10)$$

as the distance attainable in time t from speed v subject to decelerations a,A which are applied for times to bring the train to rest.

During normal running, distance travelled and time travelled are monitored, and present speed, distance to go and time to go are calculated.

Given knowledge of A and a it is then a matter of checking if distance attainable by coasting and braking, is not less than distance to go, and if this is so then COASTING should begin.

Estimate of A

Extensive testing shows that A is approximately constant on flat track, and knowledge of the gradient of the track into each station over the distance where braking normally occurs allows the quantity g sin $\theta$ to be added to the train's tested "flat track" braking deceleration to give an acceptable estimate of A for each section.

Estimate of a

The following formula gives coasting deceleration on a straight flat track as a quadratic in v $$\text{i.e. } a = k_0 + k_1 v + k_2 v^2$$

(Typically $$0 < k_0 < 0.3 \text{ ms}^{-2}$$

$$0 < k_1 < 0.01 \, s^{-1}$$

$$0 < k_2 < 0.0003 \text{ m}^{-1}$$

for $v < 30 \text{ ms}^{-1}$.)

Obviously the values of $k_0$, $k_1$, $k_2$ will vary with the wind and the condition of the track and wheels.

In order to obtain a useful estimate of a for each section of track, the average deceleration during previous runs on each section is stored with the position and speed at the start of deceleration.

This allows a collection of (x,v,a) to be compiled for each section. The varying weather conditions and possibly slight degradation of track and wheel performance will have influenced the recorded values. In a particular run, the value of "a" to be used comes from a least squares best fit to the set of previously collected values. The number of values (x,v,a) stored for each section is about 16, with old values being discarded as new values are added. It is found that during normal running values of a corresponding to very small v are not available, but are valuable to control the orientation of approximating surfaces. To provide such control, several values of a for small v are calculated from the Davis formula and added to the list.

Another controlling value for large v (near the largest v obtained during normal running) is also calculated to ensure convexity of the approximating surface, and is added to the list.

The approximating surface used (a=f(x,v)) is a quadratic least squares best fit to the 16 stored values (x,v,a).

The approximating value is given by $$a(x^*, v^*) = \sum_{i=0}^{6} c_i P_i(x^*, v^*) \text{ where} \quad (11)$$

$$\left.\begin{array}{l} P_0 = 1,\ P_1 = x + \alpha_1,\ P_1 = v + \alpha_2 P_1 + \alpha_3 \\ P_3 = xP_1 + \alpha_4 P_2 + \alpha_5 P_1 + \alpha_6 \\ P_4 = xP_2 + \alpha_7 P_3 + \alpha_8 P_2 + \alpha_9 P_1 + \alpha_{10} \\ P_5 = vP_2 + \alpha_{11} P_4 + \alpha_{12} P_3 + \alpha_{13} P_2 + \alpha_{14} P_1 + \alpha_{15} \end{array}\right\} \quad (12)$$

$$\text{and } \sum_k P_i(x_k, v_k)\, P_j(x_k, v_k) = 0 \text{ if } i \neq j. \quad (13)$$

$$c_i = \sum_k a(x_k, v_k)\, P_i(x_k, v_k) / \sum_k P_i^2(x_k, v_k) \quad (14)$$

The use of orthogonal polynomials in this calculation has among its advantages the fact that the calculation of the orthogonal polynomial and the $c_i$ for a particular section can easily be carried out while the train is stationary waiting to start the section. All that is required during acceleration is the valuation of a from (11) for given x,v, then the calculation of distance attainable from (6), (4), (9) followed by a decision.

There are, of course, other situations that must be checked in parallel; namely that v does not exceed maximum allowed speed at any part of the section and that v does not exceed $\sqrt{2AX}$ which is "start of braking" speed from (7).

The COAST decision is ideally made when the train's trajectory in the velocity-distance plane encounters a three-dimensional surface which can be thought of as being described by values of three variables, namely distance-to-go, time-to-go and velocity. The train coasts as early as it can be consistent with on time arrival. To decide the moment of coasting actual time-to-go is regularly compared with a prediction of time required, made from a dynamic model of the train's performance.

In this embodiment, advice to the driver to DRIVE, COAST or BRAKE is purely advisory and if followed minimum fuel usage is achieved by accelerating as fast as possible and then coasting for the maximum period allowable within the constraints of timetable requirements and their existing slack periods. The timetable always takes precedence and external conditions such as temporary speed restrictions and wet or slippery rails can be accommodated by the system by recalculation of coasting and stopping points within the timetable constraints.

The Driver Advice Unit advises the driver using three methods; two visual and one audible. The primary method is to illuminate one of three indicators which are clearly labelled DRIVE, COAST and BRAKE. The three lights are mounted at very different angles to avoid any chance of confusion. When the DRIVE light is lit, the driver should operate the railcar normally, taking into account current driving conditions, any speed restrictions and the character of the line. When the COAST light is lit, the unit is informing the driver that the next station can be reached on time if the railcar is coasting. When the BRAKE light is lit the driver should apply the brakes to bring the railcar to a halt at the correct platform position. Every time the advice changes a unique tone pattern will sound to advise the driver of the change. The only time that the display will change and a tone will not sound is when the Advice Unit resets for the next segment of the journey. The third advice method is by the display of the appropriate word on the two line display in the front of the unit. This display is provided to allow the unit to be set up for each journey but is also used to display the train number, the current time and the next stopping point.

The invention initially requires only gradient data and schedule data to be fed to it from external sources or supplied programmed into the storage means. Alternatively the data could be suplied via direct connect or radio link means. The remaining parameters required to make the best achievable estimate of the required COAST decision switching surfaces are automatically collected and updated as each journey proceeds, so that slow and consistent variations in train coasting performance are automatically tracked, and sudden changes in track conditions (e.g. new temporary speed restrictions) are automatically "learnt" by the system after a number of runs. On the other hand, stochastic variations, such as changes in train resistance caused by wind conditions, are not followed and the accepted optimum strategy of making a least-squares estimate of the most likely values of relevant stochastic parameters is used.

Maximum possible coasting time is allowed in each case, and it should be noted that the algorithms depend only on train performance during COAST and BRAKE modes, and will operate without modification for any type of condition of traction system, whether diesel-hydraulic, diesel-electric, electric AC or electric DC.

Figure 2:
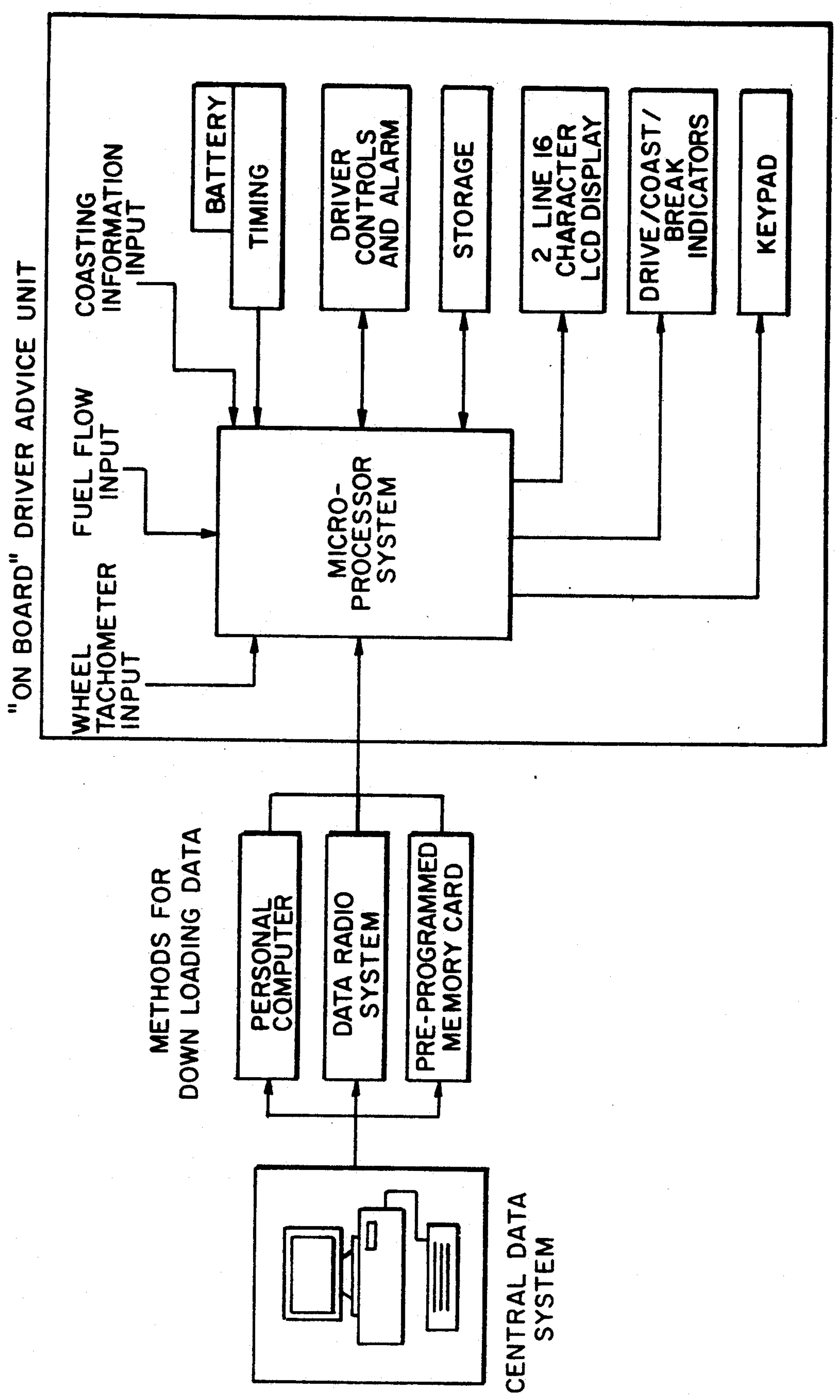
FIG. 2 shows a representation of the driver advice means and data input means.

Reference is now made to FIG. 2:

The on-board driver advisory system consists of inputs from the axle tachometer, fuel flow and coasting detector inputs, driver control input; a visual display which further comprises two parts; an alphanumeric display and DRIVE, COAST and BRAKE visual indicator, a key pad data input device and a microprocessor calculation and controller device.

The controller device performs the tasks of data collection, tactics generation, display generation and data logging. To do this, a microprocessor is used. In addition to its on-board functions, the control unit has also been used for software development and testing.

During the course of a journey, the following information is collected or computed by the on-board system twice per second however this period may be longer or shorter;

current journey segment
distance-to-go to next station
velocity of train
position of driver's control (COAST or NOT)

Journey time is calculated using a battery backed real-time clock by subtracting the present time from scheduled journey departure time. The clock is also used to generate a time of day display for the driver. It is found that a resolution of one second is adequate for all purposes.

It is normal that STA Class 2000 trains utilise an axle rotation pulse generator that generates 128 pulses per revolution of the wheel and use is made of this facility to determine distance and velocity. A 16 bit counter is used to count the pulses from the wheel. The counter is read as required, and the count accumulated to calculate the train position. The distance count is automatically corrected at each station stop from the table of information within the computer on-board.

The train speed is determined by counting the pulses from the axle generator over a given interval of time, (usually one second). Each time the distance counter is read, the average speed of the train since the last reading is calculated. Journey data consisting of TRAIN, TRACK and SCHEDULE data are loaded into on-board memory, while the train is stationary at times convenient to the operation of the system. The data, together with input signals from the wheel tachometer, and the driver's control relays are used to calculate the journey state. Other data required to generate the optimal driving advice are also stored on-board and updated after each journey.

During each journey a journey log is written into battery backed RAM. The display panel is the interface between the on-board system and the driver and provides guidance information for the driver.

Each display panel indicates the following information:

the currently advised driving tactic (ACCELERATE, HOLD, COAST, BRAKE);
the speed to be held;
the current time of day (optional).

In this embodiment a terminal can be connected to the control unit via a standard RS32 serial port. Its functions are to initiate the running of a program, to display the information being logged by the control unit, and to allow other data to be input or output by the application programmer during the system development but this function could also be performed by a data radio link to a central data system and/or a preprogrammed memory storage cartridge as shown in FIG. 2.

Figure 3:
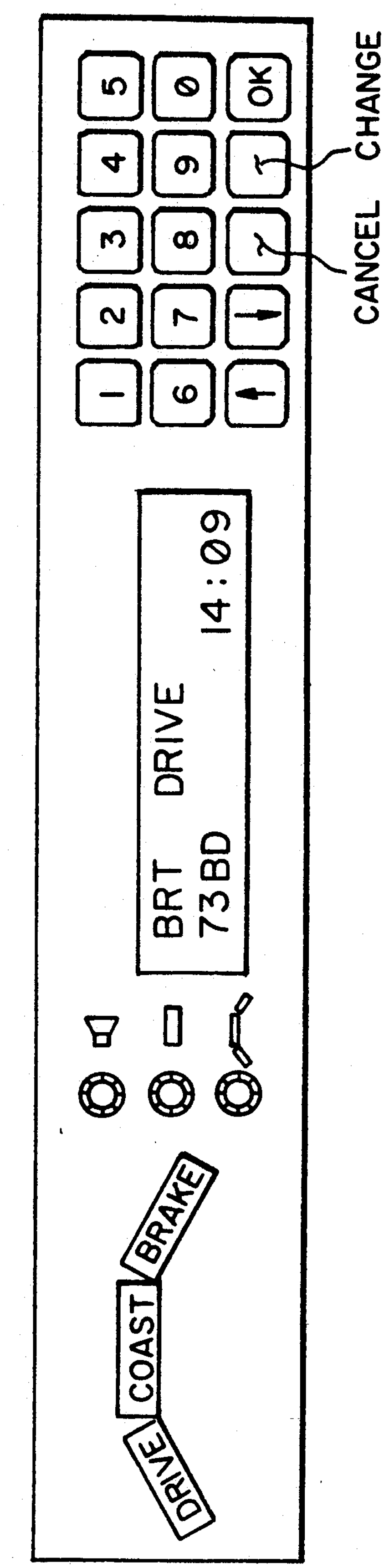
FIG. 3 shows a representation of the driver advice means.

The Driver Advice Unit FIG. 3 uses an STD bus system and the components of that system include a 13 slot STD bus card frame, DC power supplies, twin disk drive, an Intel Z80A microprocessor, counter/timer card, input/output card, 32 k CMOS RAM card, real time clock and counter card and utility card.

The claims defining the invention are as follows:

1. An apparatus indicating appropriate coast times for a vehicle for controlling said vehicle, travelling between a start point and a finish point to enable said vehicle to achieve a maximum period of coasting, comprising:

- a calculation means;
- a timer providing signals to said calculation means representing the current time and time elapsed since commencement of travel from said start point;
- a distance travelled and velocity monitor means providing signals to said calculation means representing the distance travelled from said start point and a velocity measurement signal;
- a signal means to indicate at least when to commence coasting;
- a storage means containing at least one coasting value corresponding to a plurality of velocity and position values and at least one braking value corresponding to said plurality of velocity and position values for said vehicle, and values representing the predetermined time of arrival at said finish point and the distance between said start point and said finish point; whereby
- said calculation means uses the time elapsed and the distance travelled to determine the velocity of said vehicle and position of said vehicle and calculates from at least one of said at least one coasting value and said at least one braking value a time of arrival, at said finish point if coasting were to commence at the current time, and if said calculated time of arrival is less than the time remaining to the predetermined time of arrival said calculation means operates said signal means to indicate when to commence coasting and thereby control said vehicle, whereby operation of said signal means will indicate when to commence coasting and enable said vehicle to achieve a maximum period of coasting.

2. The apparatus according to claim 1 wherein a coasting characteristic comprises a plurality of acceleration values obtained during coasting periods, said apparatus further comprising a coasting indicator means which indicates said coasting, said storage means stores said distance travelled and velocity measurement signals which are measured during said coasting, said calculation means then calculates an average acceleration by using the said stored distance travelled and velocity measurement signals, said plurality of acceleration values form a surface whereby any point on the surface is calculated by said calculation means using a least squares best fit quadratic to the obtained points to provide an estimated coasting acceleration for any of said distance travelled and velocity measurement signals.

3. The apparatus according to claim 1 wherein a braking characteristic comprises a constant acceleration value representing said vehicle's braking characteristic added to a constant acceleration value representing a gradient characteristic of said star point to said finish point wherein said calculation means calculating a braking deceleration curve terminating at said finish point for any of said distance travelled and velocity measurement signals.

4. The apparatus according to claim 2 wherein for any said distance travelled or any said velocity measurement signal the coasting value and braking value are used in said calculation means to provide a predicted time of arrival of said vehicle at the finish point.

5. The apparatus according to claim 2 wherein said least squares best fit quadratic uses an orthogonal polynomial to estimate said coasting value corresponding to any said distance travelled and velocity measurement signals.

6. The apparatus according to claim 3 wherein said coasting value is calculated based on the last sixteen values corresponding to stored values of said distance travelled and velocity measurement signals during periods of coasting over the same said start point to said finish point.

7. The apparatus according to claim 1 wherein said signal means to indicate when to commence coasting comprises an advisory panel.

8. The apparatus according to claim 7 wherein said advisory panel comprises audible and visual signal means to alert the driver of the coast decision having been made by said calculation means.

9. The apparatus according to claim 8 wherein said advisory panel comprises visual signal means comprising at least the words COAST and BRAKE further having illuminated means for said words arranged at angles differing to each other.

10. The apparatus according to claim 3 wherein said storage means further contains a constant deceleration braking value representative of the mean deceleration during braking of said vehicle, wherein said calculation means uses said distance travelled signal, said time elapsed signal, and said constant deceleration braking value to provide a time at which said calculation means operates said signal means to indicate when the commence braking of said vehicle.

11. The apparatus according to claim 1 wherein said calculation means comprises a microprocessor.

12. The apparatus according to claim 2 wherein said storage means contains initial estimates of said coasting and braking values corresponding to said velocity and position values, wherein said initial estimates of said coasting and said braking values are preprogrammed into said storage means or down loaded from a personal computer via direct link means or data radio means.

13. The apparatus according to claim 1 wherein said distance travelled and velocity monitor means comprises a wheel tachometer.

14. The apparatus according to claim 1 wherein said signal means which indicates when to commence coasting has an output signal which is adapted to control the acceleration of said vehicle.

15. The apparatus according to claim 7 wherein said advisory panel comprises an alphanumeric display to indicate to a vehicle occupant said start point and said finish point.

16. The apparatus according to claim 7 wherein said advisory panel comprises an alphanumeric display to indicate to a vehicle occupant the current time.

17. The apparatus according to claim 3 wherein for any said distance travelled and any said velocity measured signals said coasting value and said braking value are used in said calculation means to provide a predicted time of arrival of said vehicle at said finish point.

* * * * *

UNITED STATES PATENT AND TRADEMARK OFFICE
CERTIFICATE OF CORRECTION

PATENT NO. : 5,239,472 Page 1 of 2

DATED : August 24, 1993

INVENTOR(S) : Andrew M. Long, Ian P. Milroy, Basil R. Benjamin, Guiseppe A. Gelonese and Peter J. Pudney

It is certified that error appears in the above-indentified patent and that said Letters Patent is hereby corrected as shown below:

replace the Abstract as follows:

--ABSTRACT OF THE DISCLOSURE

A method and device is provided whereby a vehicle travelling between two fixed points may be controlled either automatically or by prompting a driver to accelerate, coast and brake when required, to meet a predetermined time of arrival at a specific finish point whereby the period of coasting is maximized. The utilization of this method maximizes fuel efficiency by the vehicle. The progress of the vehicle is monitored and will translate into a velocity/distance curve. The time to COAST and BRAKE is determined from knowing and approximating the vehicle's coasting and braking characteristics along the route ahead and, in conjunction with the real time velocity/distance curve, determining COAST and BRAKE times. Signal means are actuated to indicate the action of COAST and BRAKE.--

*Column 3 Line 20 Equation (1)* "$\int_0^{Tv*}$" *should read*--$\int_0^{T} v*$--.

*Column 3 Line 26 Equation (2)* "$\int_T^{tv*}$" *should read* --$\int_T^{t} v*$--.

Column 3 Line 27 after Equation (2) insert --so--.

UNITED STATES PATENT AND TRADEMARK OFFICE
CERTIFICATE OF CORRECTION

PATENT NO. : 5,239,472 Page 2 of 2

DATED : August 24, 1993

INVENTOR(S) : Andrew M. Long, Ian P. Milroy, Basil R. Benjamin, Guiseppe A. Gelonese and Peter J. Pudney

It is certified that error appears in the above-indentified patent and that said Letters Patent is hereby corrected as shown below:

*Column* 3 *Line* 30 *Equation* (3) "$\int_0^{Tv*}$" *should read* --$\int_0^{T} v*$--.

*Column* 3 *Line* 30 *Equation* (3) "$\int_T^{tv*}$" *should read* --$\int_T^{t} v*$--.

Column 6 Line 67 "RS32" should read --RS232--.

Claim 3 Line 1 Column 8 "star" should read --start--.

Claim 10 Lines 39-40 Column 8 "when the commence" should read --when to commence--.

Signed and Sealed this

Third Day of May, 1994

Attest:

BRUCE LEHMAN

*Attesting Officer* *Commissioner of Patents and Trademarks*